(12) United States Patent
Sawchuk et al.

(10) Patent No.: US 9,334,886 B2
(45) Date of Patent: May 10, 2016

(54) FLOW CONDITIONER WITH INTEGRAL VANES

(71) Applicant: Canada Pipeline Accessories, Co. Ltd., Calgary (CA)

(72) Inventors: Daniel Sawchuk, Chestermere (CA); Reginald Selirio, Calgary (CA)

(73) Assignee: Canada Pipeline Accessories, Co. Ltd., Calgary, Alberta (CA)

( * ) Notice: Subject to any disclaimer, the term of this patent is extended or adjusted under 35 U.S.C. 154(b) by 0 days.

(21) Appl. No.: 14/420,943

(22) PCT Filed: Sep. 12, 2013

(86) PCT No.: PCT/CA2013/050705
§ 371 (c)(1),
(2) Date: Feb. 11, 2015

(87) PCT Pub. No.: WO2014/040191
PCT Pub. Date: Mar. 20, 2014

(65) Prior Publication Data
US 2015/0240843 A1      Aug. 27, 2015

Related U.S. Application Data

(60) Provisional application No. 61/700,421, filed on Sep. 13, 2012.

(51) Int. Cl.
*F15D 1/02* (2006.01)
*G01F 15/00* (2006.01)

(52) U.S. Cl.
CPC ............... *F15D 1/025* (2013.01); *G01F 15/00* (2013.01)

(58) Field of Classification Search
CPC ........................................................ F15D 1/025
USPC ......................................................... 138/42, 44
See application file for complete search history.

(56) References Cited

U.S. PATENT DOCUMENTS

| | | | |
|---|---|---|---|
| 5,341,848 A | 8/1994 | Laws | |
| 5,400,828 A * | 3/1995 | Ziu | F16L 7/00 138/111 |
| 5,495,872 A | 3/1996 | Gallagher et al. | |
| 5,606,297 A | 2/1997 | Phillips | |
| 5,762,107 A | 6/1998 | Laws | |

(Continued)

FOREIGN PATENT DOCUMENTS

| | | |
|---|---|---|
| CA | 2171828 | 3/1995 |
| CA | 2228928 | 8/1995 |

(Continued)

OTHER PUBLICATIONS

PCT/CA2013/050705, International Preliminary Report on Patentability dated Dec. 2014.

(Continued)

*Primary Examiner* — Paul R Durand
*Assistant Examiner* — Vishal Pancholi
(74) *Attorney, Agent, or Firm* — Cahn & Samuels, LLP (57) ABSTRACT

A flow conditioner includes a single disk comprising an array of holes and at least one integral vane, for example a plurality of integral vanes. The at least one integral vane is machined out of the same material as the flow conditioner and is not attached to the flow conditioner via a weld connection or adhesive.

13 Claims, 13 Drawing Sheets

(56) References Cited

U.S. PATENT DOCUMENTS

| | | |
|---|---|---|
| 5,959,216 A | 9/1999 | Hocquet et al. |
| 5,992,465 A | 11/1999 | Jansen |
| 6,807,986 B2 * | 10/2004 | Boger ............... F16K 47/08 138/44 |
| 7,073,534 B2 | 7/2006 | Sawchuk et al. |
| 7,089,963 B2 | 8/2006 | Meheen |
| 7,464,611 B2 | 12/2008 | Matter et al. |
| 7,845,688 B2 | 12/2010 | Gallagher et al. |
| 8,132,961 B1 | 3/2012 | England et al. |
| D697,581 S | 1/2014 | Sawchuk et al. |
| D701,939 S | 4/2014 | Sawchuk et al. |
| D713,492 S | 9/2014 | Sawchuk et al. |
| D721,417 S | 1/2015 | Sawchuk et al. |
| 2004/0055816 A1 * | 3/2004 | Gallagher ......... F16L 55/0331 181/256 |
| 2005/0178455 A1 | 8/2005 | Cancade et al. |
| 2008/0246277 A1 | 10/2008 | Gallagher et al. |
| 2011/0174407 A1 | 7/2011 | Lundberg et al. |
| 2011/0174408 A1 | 7/2011 | Lundberg et al. |

FOREIGN PATENT DOCUMENTS

| | | |
|---|---|---|
| CA | 2787659 | 7/2011 |
| GB | 1469648 | 4/1977 |
| WO | 2014040191 A1 | 3/2014 |
| WO | 2014110673 A1 | 7/2014 |
| WO | 2014186883 A1 | 11/2014 |

OTHER PUBLICATIONS

Various Authors, 2003 Proceedings, 38th Annual American School of Gas Measurement Technology, Sep. 2003, American School of Gas measurement Technology, 390.

* cited by examiner

FLOW CONDITIONER WITH INTEGRAL VANES

This application is a U.S. national stage application of PCT international application PCT/CA2013/050705 filed on 12 Sep. 2013, and claims priority of U.S. provisional application Ser. No. 61/700,421 filed on 13 Sep. 2012 in the U.S. Patent and Trademark Office, the entirety of which is incorporated herein by reference.

I. TECHNICAL FIELD

The present invention relates to fluid flow measurement components used in oil and gas pipelines. More particularly, the present invention relates to a flow conditioner having at least one integral vane, for example a plurality of integral vanes.

II. BACKGROUND OF THE INVENTION

Pipelines are used to transport fluids in various industries, including chemical, oil and gas, and manufacturing. These industries use processes that require fluid flow rates to be accurately measured. These measurements are performed at locations known as meter stations using a variety of different meter types. These meters function in different ways. They can use differential pressure of the fluid across an obstruction, ultrasonic signal travel times, turbine blade rotational speed, Coriolis forces, or even electrical and magnetic fields being generated due to bulk fluid movement. Almost all of these measurement methods require use of the fluid velocity distribution, known as a velocity flow profile (flow profile).

To achieve the most accurate measurements, the flow profile of the fluid entering a meter should be stable, non-rotating, and symmetric. This type of velocity distribution is known as a fully developed flow profile, and it forms naturally in very long lengths of uninterrupted straight pipe. However, having long lengths of straight pipe is impractical and cost prohibitive. As a result, meter station piping often contains elbows, tees, valves and/or other assemblies that distort the flow profile into an asymmetric, unstable, and distorted configuration. This makes it very difficult to measure the fluid flow rate in a consistently accurate and repeatable manner.

Under these conditions, flow conditioners are needed to correct the flow profile of the fluid such that it forms a fully developed flow profile which allows accurate, repeatable measurements to be made.

Several types of flow conditioners exist, including those having straightening vanes, tube bundles, or perforated plates. These flow conditioners are placed within the pipe upstream of a flow meter. A typical perforated plate flow conditioner comprises a perforated metal plate that is arranged within a pipe orthogonal to the fluid flow (e.g., across the entire cross section of pipe). The perforations or holes in the flow conditioner cause the fluid flow to be redistributed such that it forms a fully developed flow profile. The placement of a flow conditioner upstream of the flow meter ensures that the flow is fully developed before it reaches the meter. This allows the meter to perform significantly more accurate and repeatable fluid flow measurements.

Currently, vanes or vane assemblies may be welded onto flow conditioners or may comprise an assembly placed within a pipeline upstream of a flow conditioner. Due to the extreme forces in pipelines, such vanes typically fail, in particular where vanes are welded onto a flow conditioner plate. Thus, the vanes may be significantly damaged or broken into pieces, thereby damaging the pipeline and/or a downstream flow meter.

III. SUMMARY OF THE INVENTION

The present invention, in at least one embodiment, provides a flow conditioner including a single disk having an array of holes and at least one integral vane.

According to another embodiment of the present invention, a flow conditioner includes a single disk having an array of holes and a plurality of integral vanes.

The present invention, in at least another embodiment, provides a pipe assembly for flow measurement including a fluid flow pipe; and a flow conditioner disposed within the fluid flow pipe in an orientation substantially perpendicular to an axis of the fluid flow pipe and comprising a disk having an array of holes and at least one integral vane.

The present invention, in yet another embodiment, provides a fluid flow measurement system including a fluid flow pipe; a flow conditioner disposed within the fluid flow pipe in an orientation substantially perpendicular to an axis of the fluid flow pipe and comprising a disk having an array of holes and at least one integral vane; and a flow meter.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

V. DETAILED DESCRIPTION OF THE INVENTION

According to the present invention, a flow conditioner has at least one integral vane, for example a plurality of integral vanes, that is machined out of the same material as the flow conditioner itself. Thus, the at least one integral vane is physically part of the flow conditioner (e.g., physically machined out of the original flow conditioner). The at least one vane is not separately attached or connected to the flow conditioner, for example, via a weld or adhesive connection. The at least one integral vane does not extend radially on and/or linearly from a surface of a flow conditioner. The at least one integral vane reduces fluid swirl entering and/or leaving the flow conditioner, thereby improving flow conditioner performance without being torn or ripped from the flow conditioner due to pipeline forces.

The at least one integral vane at least partially follows a hole layout (e.g., the contours or pattern of the holes) of a flow conditioner. In a specific embodiment, the at least one integral vane may follow at least part of a hole pattern of an outer ring and/or inner ring of holes. The at least one integral vane may at least partly follow a hole contour or pattern of the flow conditioner, for example, from a first surface of the flow conditioner to a second surface of the flow conditioner.

Figure 1:
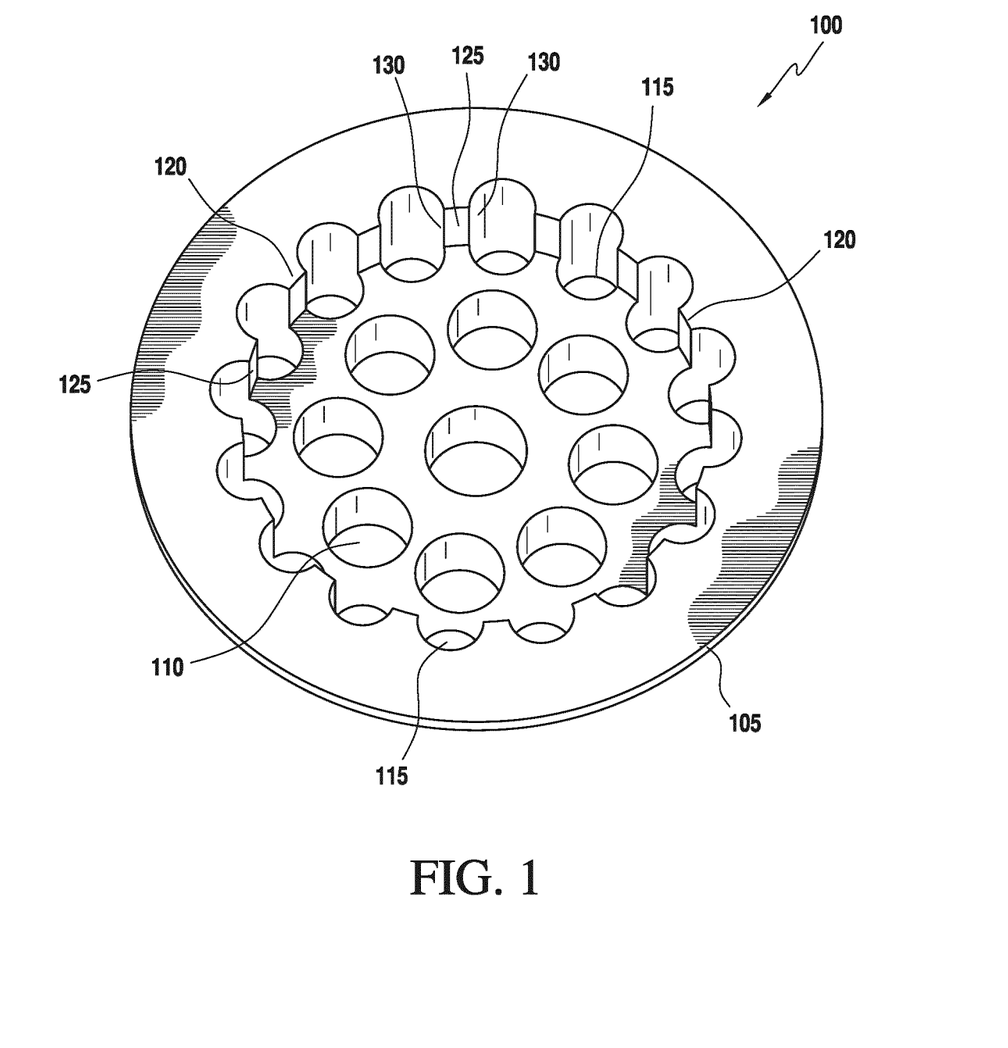
FIG. 1 illustrates an elevated perspective view of a flow conditioner having integral vanes partially following the contours of an outer ring of holes.

As shown in FIG. 1, a flow conditioner 100 according an embodiment of the present invention may comprise a single disk 105 comprising a plurality of holes or apertures 110. A plurality of integral vanes 120 is machined out of the same material as the disk 105 and partially follows the contour or pattern of an outer ring of holes 115. Each integral vane 120 extends upward from between two outer holes 115, thereby defining a substantially flat inwardly-facing surface 125 and two curved sides 130, each curved side defined by and integral with part of the circumference of an outer hole 115.

Figure 2A:
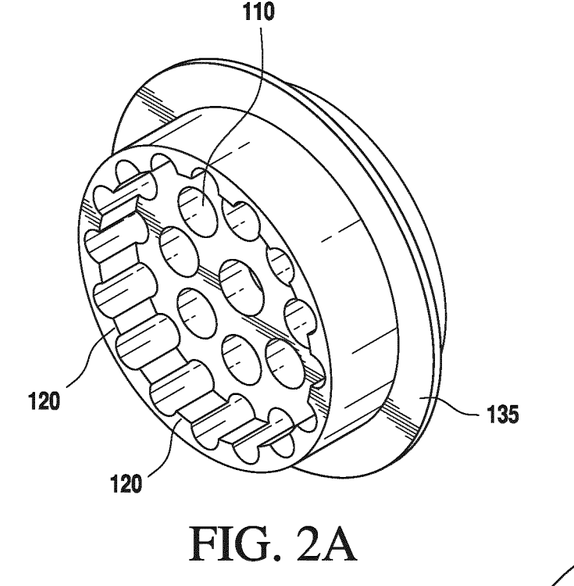
FIG. 2A illustrates a rear perspective view of a flow conditioner having a flange surrounding the flow conditioner and integral vanes on an outer ring of holes on both sides of the flow conditioner.
Figure 2B:
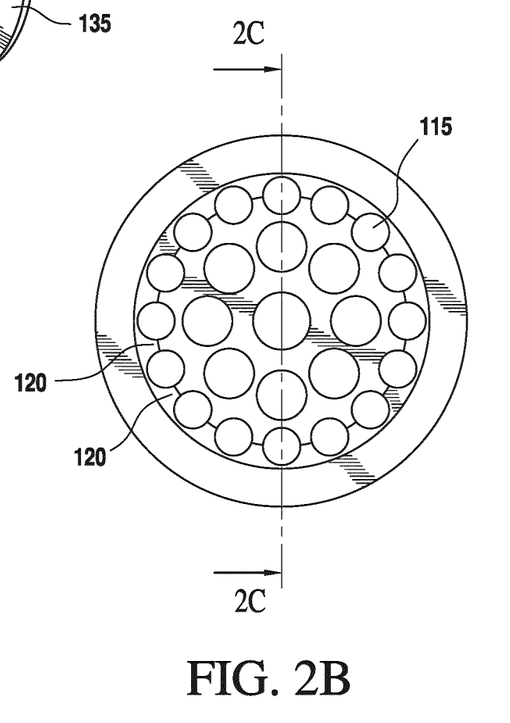
FIG. 2B illustrates a front view of the flow conditioner of FIG. 2A.
Figure 2C:
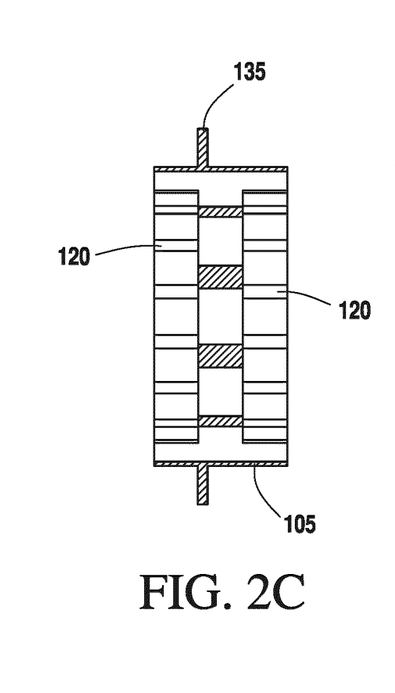
FIG. 2C illustrates a side view of the flow conditioner of FIG. 2A.
Figures 3A, 3B, 3C:
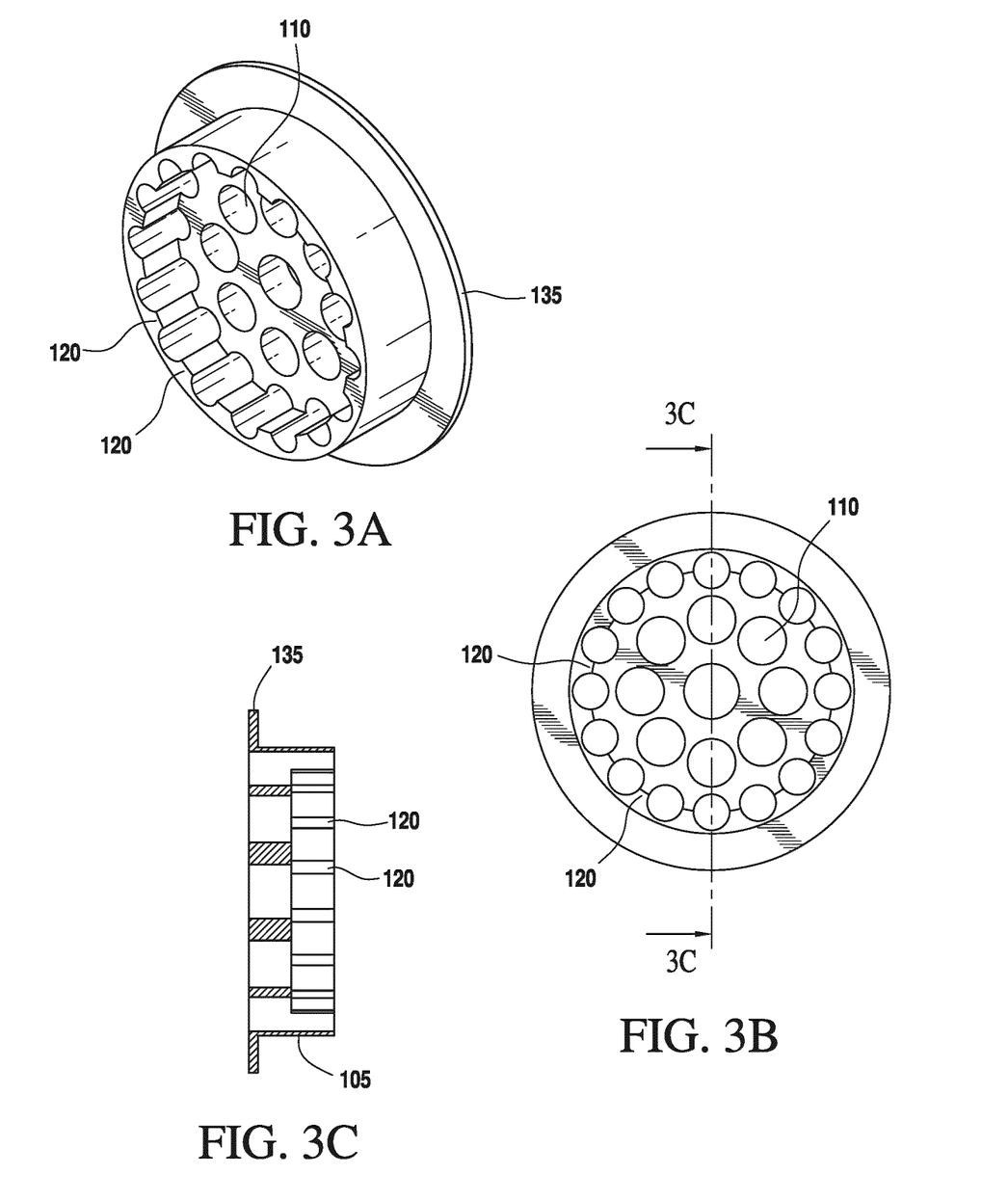
FIG. 3A illustrates a rear perspective view of a flow conditioner having a flange flush with an end of the flow conditioner and integral vanes on a downstream side of the flow conditioner.
FIG. 3B illustrates a front view of the flow conditioner of FIG. 3A.
FIG. 3C illustrates a side view of the flow conditioner of FIG. 3A.
Figure 4A:
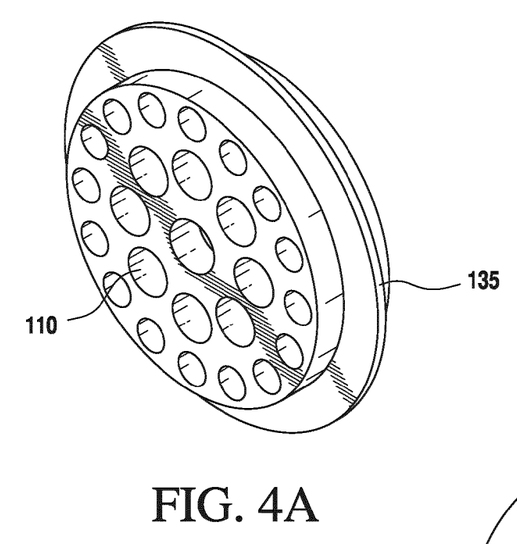
FIG. 4A illustrates a rear perspective view of flow conditioner having a flange surrounding the flow conditioner and integral vanes on an upstream side of the flow conditioner.
Figure 9A:
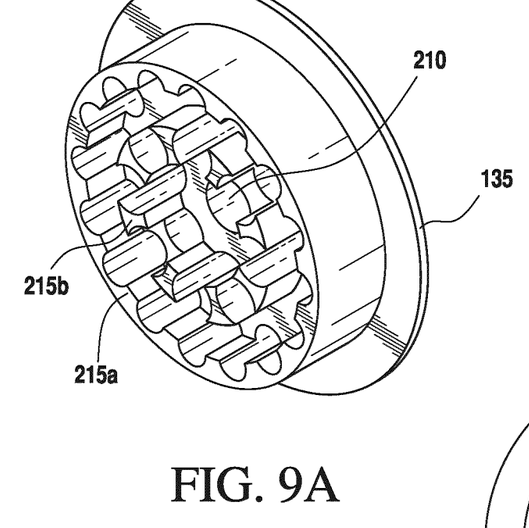
FIG. 9A illustrates a rear perspective view of a flow conditioner having a flange flush with an end of the flow conditioner and integral vanes on an outer ring and an inner ring on a downstream side of the flow conditioner.
Figure 9B:
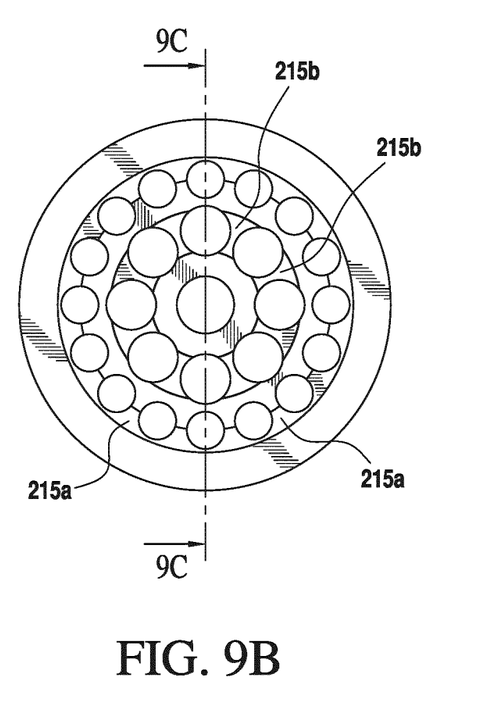
FIG. 9B illustrates a front view of the flow conditioner of FIG. 9A.
Figure 9C:
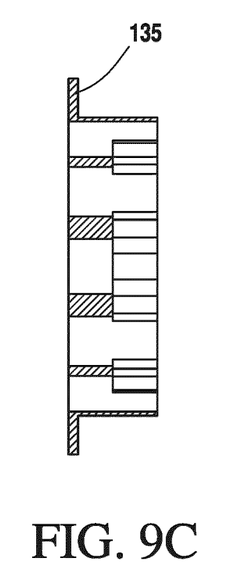
FIG. 9C illustrates a side view of the flow conditioner of FIG. 9A.

An optional flange 135 may surround a flow conditioner according to the present invention, for example as illustrated in FIGS. 2A and 4A, or may be flush with an end (e.g., an upstream end/face or a downstream end/face) of the flow conditioner, for example as illustrated in FIGS. 3A and 9A. The flange may provide a connection to a pipe within which the flow conditioner is installed.

According to a specific embodiment of the present invention, a plurality of integral vanes 120 may be on both sides of a flow conditioner, as illustrated in FIGS. 2A-2C and FIG. 7. Alternatively, a plurality of integral vanes 120 may be on a downstream side of a flow conditioner, as illustrated in FIGS. 3A-3C and FIG. 6, or may be on an upstream side of a flow conditioner, as illustrated in FIGS. 4A-4C and FIG. 5.

Figure 8:
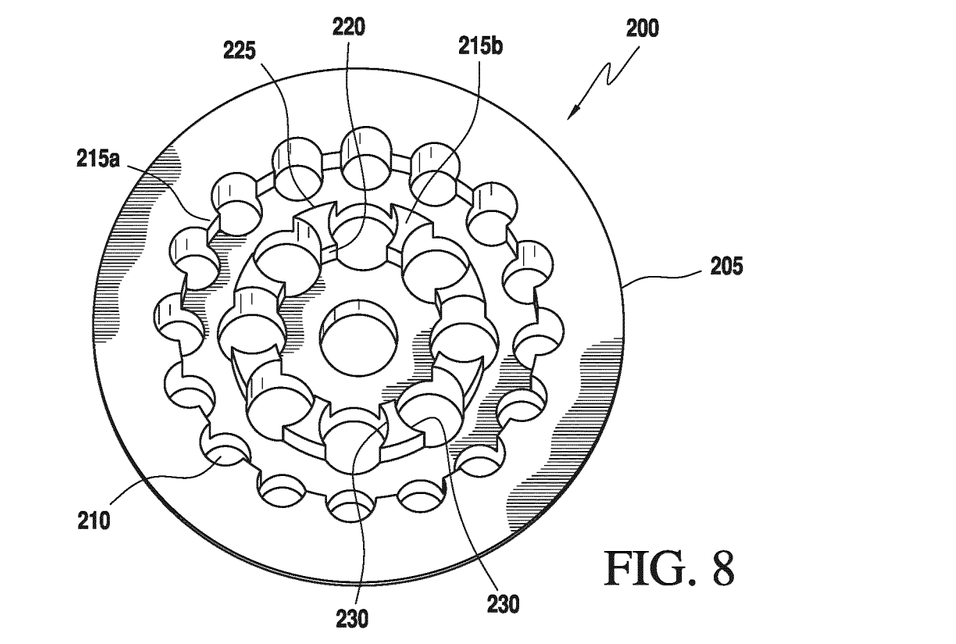
FIG. 8 illustrates an elevated perspective view of a flow conditioner having integral vanes following the contours of an outer ring of holes and an inner ring of holes.

According to a specific embodiment of the present invention, as shown in FIG. 8, a flow conditioner 200 may comprise a single disk 205 comprising a plurality of holes or apertures 210, and having a plurality of integral vanes 215a, 215b that are machined out of the same material as the disk. One set of integral vanes 215a follows at least part of the hole contour or pattern of an outer ring of holes. In addition, another set of integral vanes 215b follows the hole contour or pattern of an inner ring of holes.

Each integral vane 215b on the inner ring of holes extends upward between two holes, thereby having 1) a first substantially inner flat surface 220 and an opposing second curved surface 225, and 2) two curved sides 230 defined by and integral with part of the circumference of a hole on either side. Each integral vane 215a on the outer ring of holes may have a configuration as discussed above with respect to FIG. 1.

Figure 10:
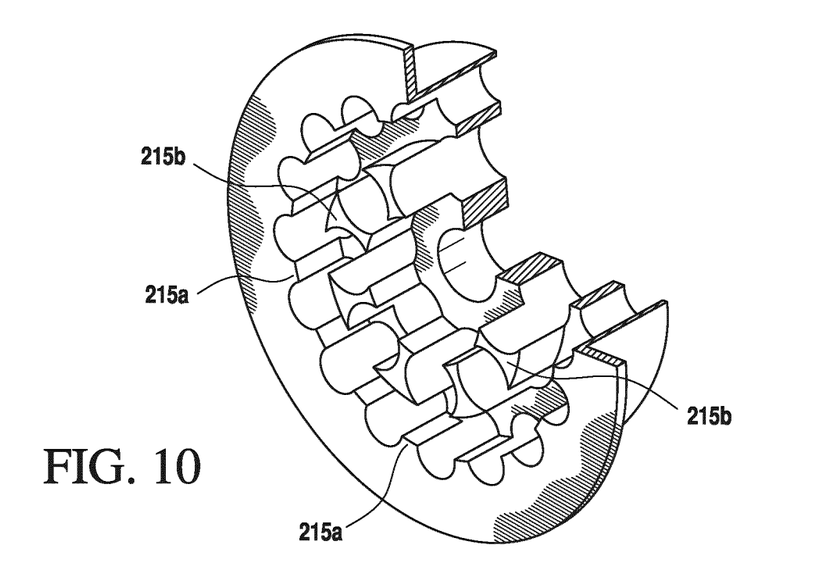
FIG. 10 illustrates a cut-away partial view of a flow conditioner with integral vanes on an outer ring and an inner ring on an upstream side of the flow conditioner.
Figure 11:
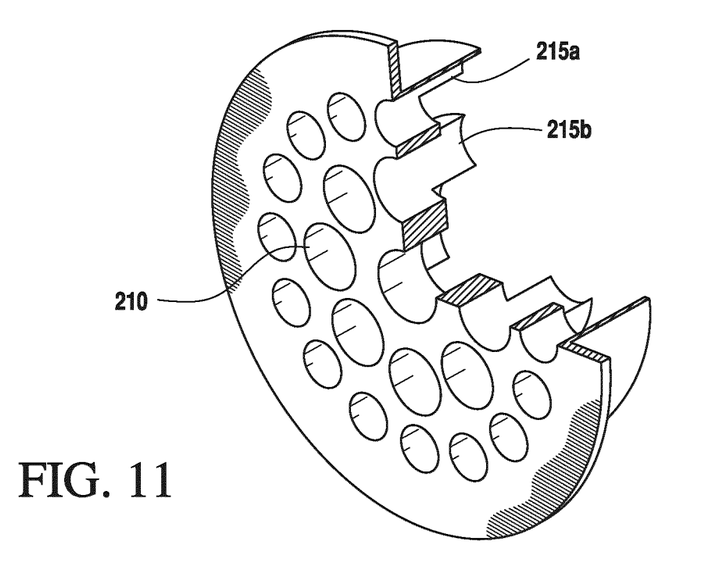
FIG. 11 illustrates a cut-away partial view of a flow conditioner with integral vanes on an outer ring and an inner ring on a downstream side of the flow conditioner.
Figure 12:
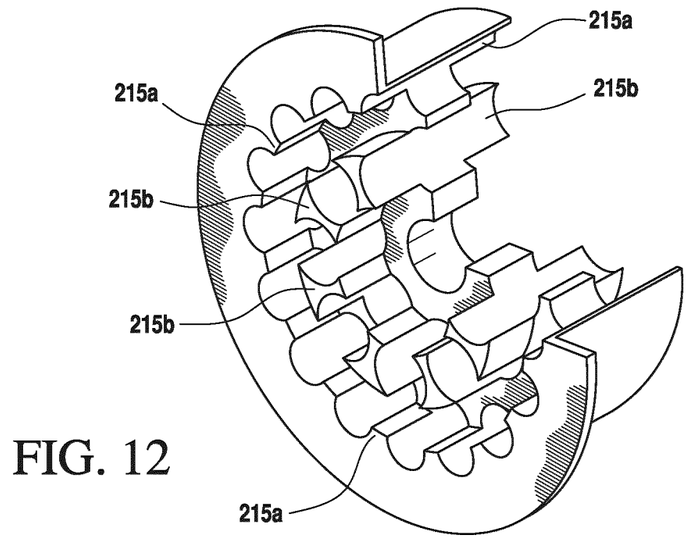
FIG. 12 illustrates a cut-away partial view of a flow conditioner with integral vanes on an outer ring and an inner ring on both sides of the flow conditioner.

According to the present invention, the plurality of integral vanes 215a, 215b may be on a downstream side of a flow conditioner, as illustrated in FIGS. 9A-9C and FIG. 11; on an upstream side of a flow conditioner, as illustrated in FIG. 10; or on both sides of a flow conditioner, as illustrated in FIG. 12.

Figure 13:
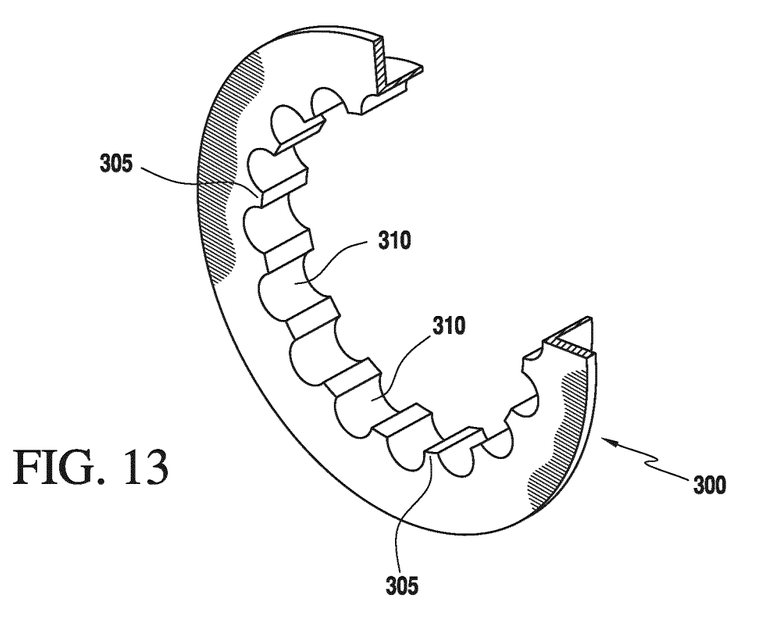
FIG. 13 illustrates a cut-away partial perspective view of a vane ring having vanes on an outer ring.

According to another embodiment of the present invention, as illustrated in FIG. 13, a flow conditioner may comprise a vane ring 300. The vane ring 300 may be a separate element that may be used by itself in a pipeline or may be applied to or fit on an existing flow conditioner. A vane ring 300, for example, may comprise a plurality of outer vanes 305 along a contour or pattern of outer holes 310, with everything else corresponding to the flow conditioner drilled out. The vane ring 300 may be installed in an upstream or downstream configuration, either by itself or with an existing flow conditioner.

The vane ring 300 may have a flange. In a specific embodiment, the vane ring 300 may be clamped on or into a flange of an existing flow conditioner and sit immediately upstream of a flow conditioner plate. The flange closing pressure will hold the vane ring onto the flow conditioner, without the need for any weld or adhesive connection.

Suitable flow conditioners that may be modified to have at least one integral vane according to the present invention include, but are not limited to, CPA TBR and CPA 50E flow conditioners available from Canada Pipeline Accessories of Calgary, Canada; and the flow conditioners described in U.S. Pat. No. 5,341,848, which is herein incorporated by reference in its entirety.

In specific embodiments, the flow conditioner (e.g., diameter; hole sizes, placement, and configuration) may be sized to a pipe inside diameter ID (95%-99% ID). In specific embodiments, the flow conditioner width or thickness may be about 5%-30% of Pipe ID. In specific embodiments, the length of the at least one vane or a plurality of vanes may be about 5%-500% of pipe ID. In specific embodiments, an outer ring of vanes may have a length of between 70%-95% of the pipe ID and an inner ring of vanes may have a length of between about 35% to 65% of the pipe ID.

The flow conditioner according to the present invention may be utilized in existing piping without making modifications. In specific embodiments, the flow conditioner may have a flanged connection, which is frequently available in meter stations. Thus, it is very simple and extremely compatible with meter station layouts.

Figure 14:
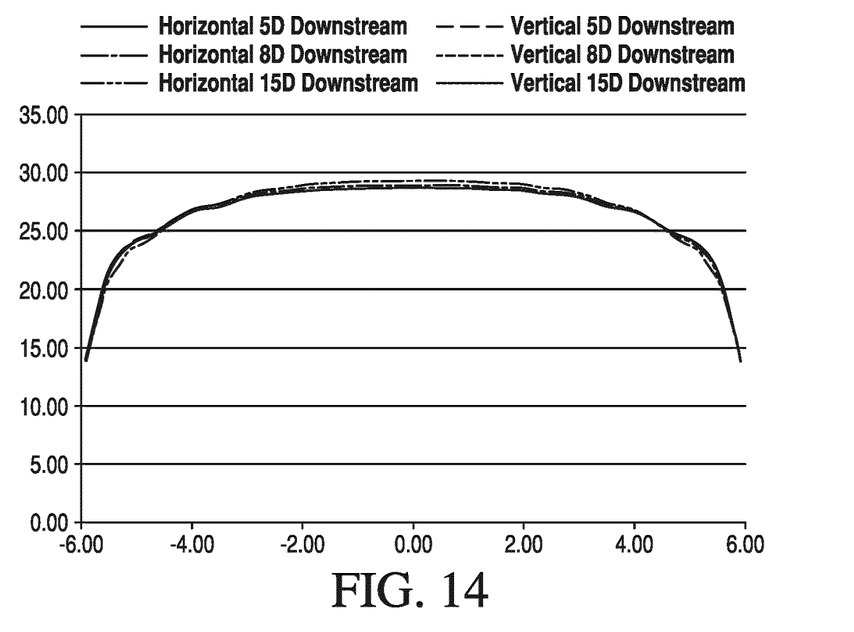
FIG. 14 is a graph showing a flow profile in a straight pipe with the flow conditioner of FIGS. 3A-C.

FIG. 14 is a graph showing a flow profile in a straight pipe with the flow conditioner of FIGS. 3A-C. All runs were done with natural gas as the fluid and with a 5 MPa outlet pressure. For a fluid having an initial fluid velocity of 25 m/s, FIG. 14 shows the fluid flow profiles measured horizontally (along a longitudinal axis of the length of the pipe in which the flow conditioner is installed) and vertically (along a transverse or perpendicular axis of the pipe) at distances downstream of the flow conditioner (i.e., 5 D, 8 D, and 15 D, measured in inside or internal pipe diameters). The vertical axis of the graph is the measured velocity in m/s and the horizontal axis of the graph is the diameter across a pipe (i.e., 0.00 is the center of the pipe having an approximately 12 inch cross section).

As shown in FIG. 14, the flow profile has a fully developed form at each measured distance (5 D, 8 D, and 15 D) and the illustrated flow lines substantially overlap.

Figure 4B:
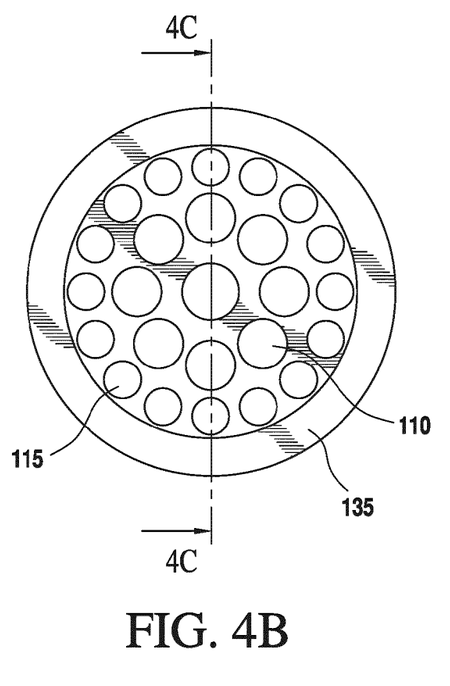
FIG. 4B illustrates a front view of the flow conditioner of FIG. 4A.
Figure 4C:
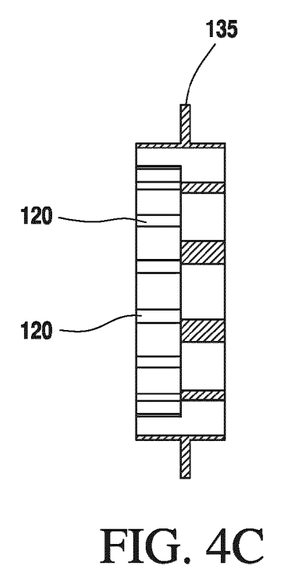
FIG. 4C illustrates a side view of the flow conditioner of FIG. 4A.
Figure 5:
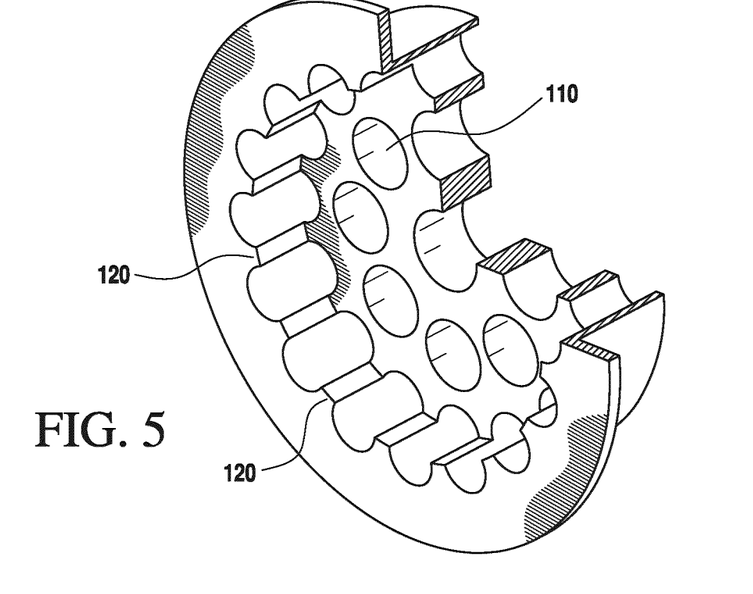
FIG. 5 illustrates a cut-away partial view of a flow conditioner with integral vanes on an outer ring on an upstream side of the flow conditioner.
Figure 6:
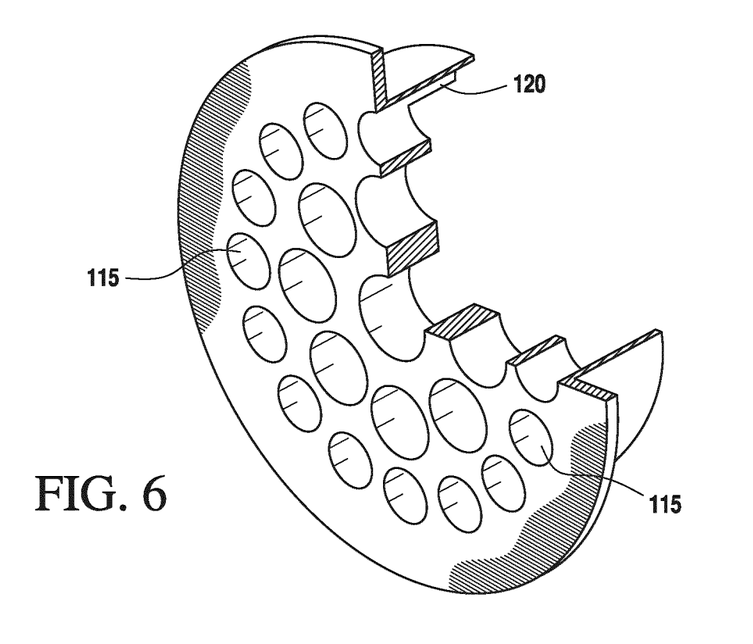
FIG. 6 illustrates a cut-away partial view of a flow conditioner with integral vanes on an outer ring on a downstream side of the flow conditioner.
Figure 7:
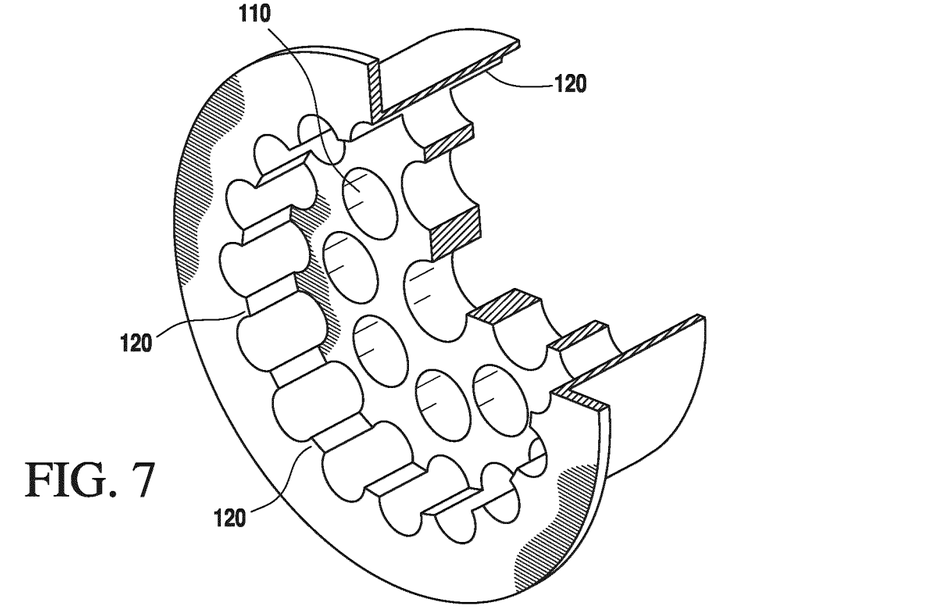
FIG. 7 illustrates a cut-away partial view of a flow conditioner with integral vanes on an outer ring on both sides of the flow conditioner.
Figure 15:
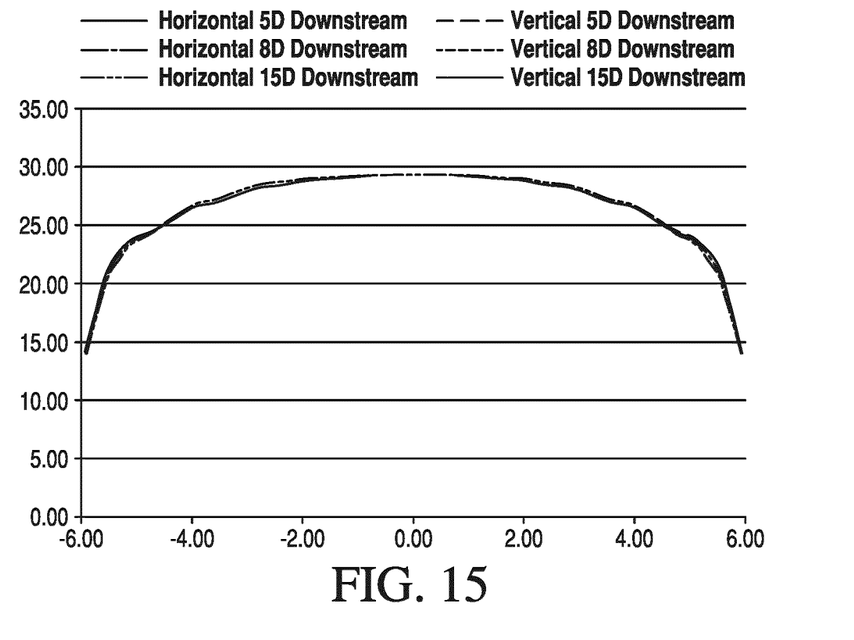
FIG. 15 is a graph showing a flow profile in a straight pipe with the flow conditioner of FIGS. 4A-C.

FIG. 15 is a graph showing a flow profile in a straight pipe with the flow conditioner of FIGS. 4A-C. Measurements were taken as described above with respect to FIG. 14. The flow profile has a fully developed form at each measured distance (5 D, 8 D, and 15 D) and the illustrated flow lines substantially overlap.

Figure 16:
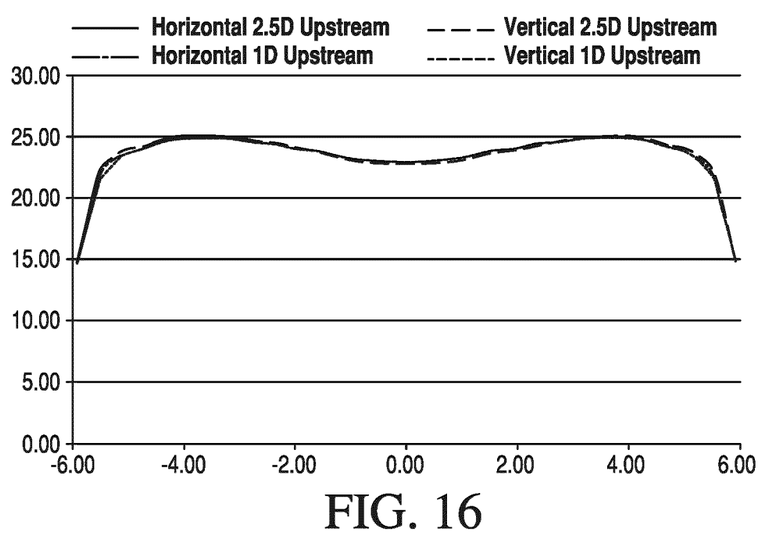
FIG. 16 is a graph showing a flow profile in an empty pipe, the fluid having 30 degrees of swirl.

FIG. 16 is a graph showing a flow profile in an empty pipe, the fluid having 30 degrees of swirl.

Figure 17:
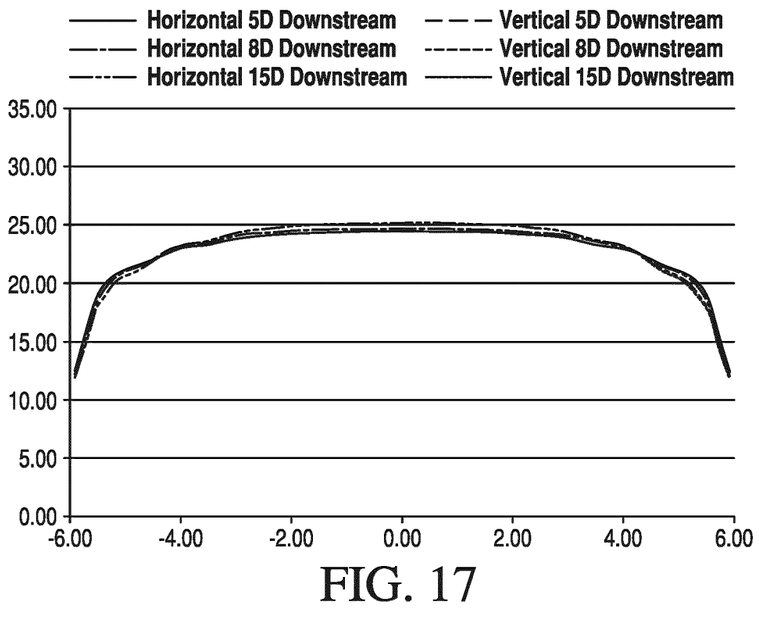
FIG. 17 is a graph showing a flow profile of the flow profile with the flow conditioner of FIGS. 3A-C, the fluid having 30 degrees of swirl.

FIG. 17 is a graph showing a flow profile of the flow conditioner of FIGS. 3A-C, the fluid having 30 degrees of swirl. Measurements were taken as described above with respect to FIG. 14. The flow profile has a fully developed form at each measured distance (5 D, 8 D, and 15 D) and the illustrated flow lines substantially overlap.

Figure 18:
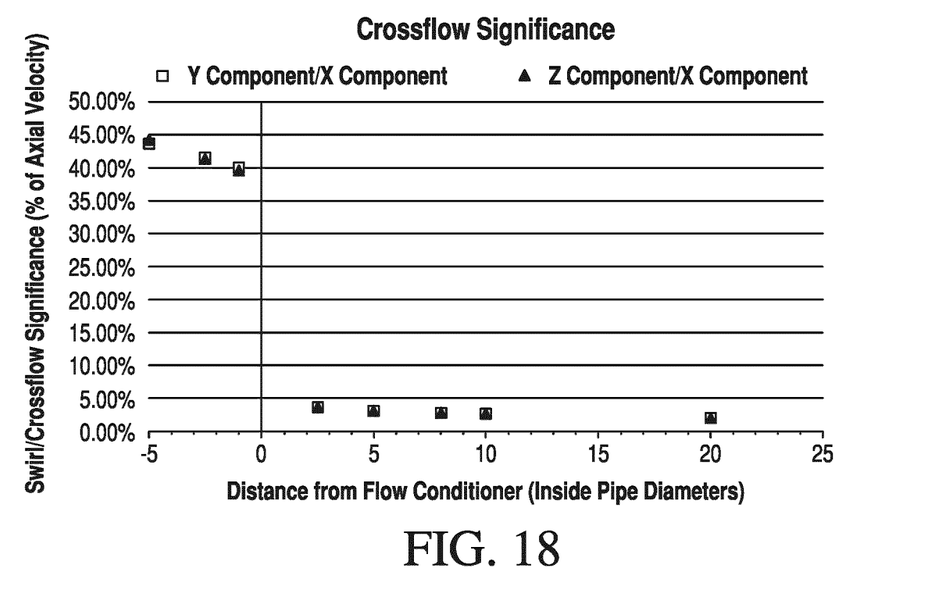
FIG. 18 is a graph showing the crossflow (swirl) significance with a flow conditioner of FIGS. 3A-C, the fluid having 30 degrees of swirl.

FIG. 18 is a graph showing the crossflow (swirl) significance with a flow conditioner of FIGS. 3A-C, the fluid having 30 degrees of swirl. The vertical axis is the swirl/crossflow significance (measured as a percentage of axial velocity) and the horizontal axis is the distance from the flow conditioner (measured in inside pipe diameters). As shown in FIG. 18, the swirl/crossflow significance substantially drops downstream of the flow conditioner, which is installed at zero.

Figure 19:
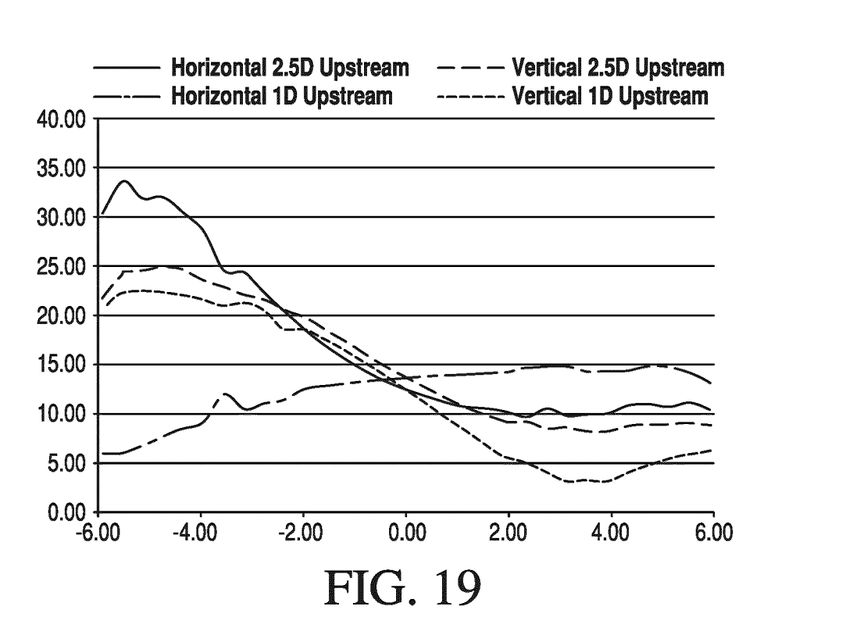
FIG. 19 is a graph showing flow profiles in an empty pipe having upstream piping.

FIG. 19 is a graph showing flow profiles in an empty pipe having upstream piping according to the International Organization of Legal Metrology (OIML) R137 standard. For a fluid having an initial fluid velocity of 25 m/s, FIG. 19 shows the fluid flow profiles measured horizontally and vertically at distances 1 D and 2.5 D upstream from the point where the flow conditioner would be installed. The vertical axis of the graph is the measured velocity in m/s and the horizontal axis of the graph is the diameter across a pipe (i.e., 0.00 is the center of the pipe having an approximately 12 inch cross section).

Figure 20:
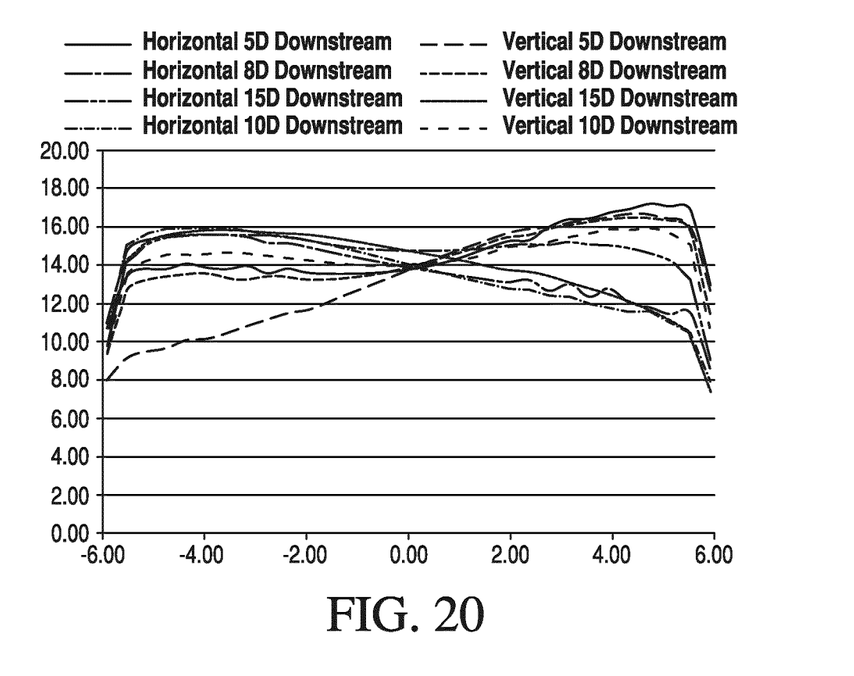
FIG. 20 is a graph showing flow profiles with the vane ring of FIG. 13 in the upstream piping of FIG. 19.

FIG. 20 is a graph showing flow profiles in the pipe of FIG. 19 having a vane ring of FIG. 13 installed in a downstream configuration. Fluid flow profiles were measured horizontally and vertically at distances downstream of the vane ring (i.e., 5 D, 8 D, 10 D, and 15 D).

Figure 21:
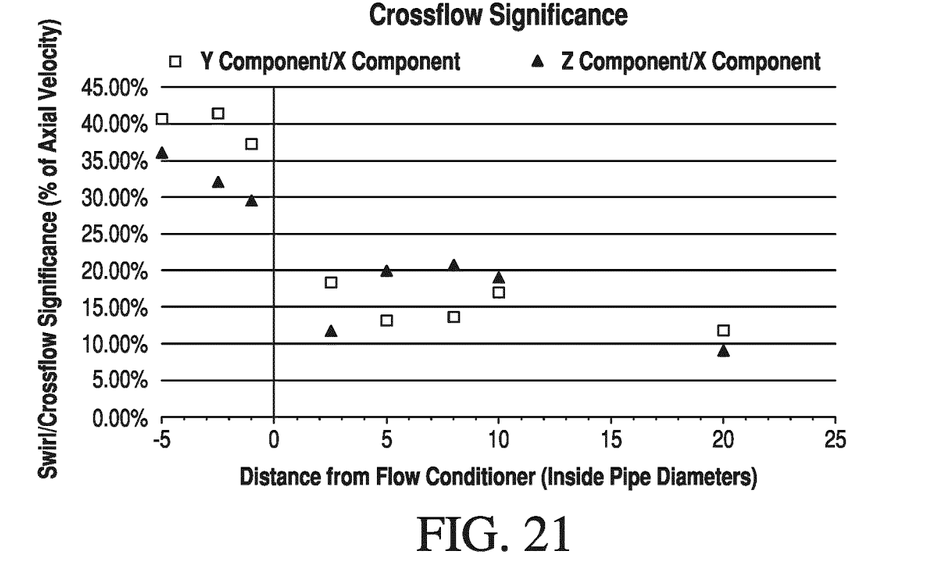
FIG. 21 is a graph showing the crossflow significance with a vane ring of FIG. 13, the fluid having 30 degrees of swirl.

FIG. 21 is a graph showing the crossflow significance in the pipe of FIG. 19 having a vane ring of FIG. 13 installed in a downstream configuration, the fluid having 30 degrees of swirl. The vertical axis is the swirl/crossflow significance and the horizontal axis is the distance from the flow conditioner. As shown in FIG. 21, the swirl/crossflow significance drops downstream of the vane ring, which is installed at zero.

VI. INDUSTRIAL APPLICABILITY

The present invention relates to a flow conditioner having at least one integral vane, for example, a plurality of integral vanes. The integral vanes reduce fluid swirl entering and/or leaving the flow conditioner, thereby improving flow conditioner performance without tearing or ripping the integral vane from the flow conditioner due to pipeline forces.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:
1. A flow conditioner, comprising:
   a single disk comprising a plurality of holes including an outer ring of holes and a plurality of integral vanes,
   wherein each integral vane is defined by a substantially flat inwardly-facing surface between two outer holes and two curved sides, each curved side defined by and integral with part of the circumference of an outer hole,
   wherein each integral vane extends from a first planar surface of the flow conditioner to a second planar surface of the flow conditioner.
2. The flow conditioner according to claim 1, further comprising a flange that is flush with an upstream end or downstream end of the flow conditioner.
3. The flow conditioner according to claim 1, wherein the plurality of vanes is machined out of the same material as the single disk.

4. The flow conditioner according to claim 1, wherein the plurality of integral vanes are on an upstream side of the flow conditioner.

5. The flow conditioner according to claim 1, wherein the plurality of integral vanes are on a downstream side of the flow conditioner.

6. The flow conditioner according to claim 1, wherein the plurality of integral vanes are on both sides of the flow conditioner.

7. The flow conditioner according to claim 1, further comprising a second set of integral vanes at least partially following a circumferential contour or pattern of an inner ring of holes.

8. The flow conditioner according to claim 7, wherein each integral vane of the second set of integral vanes is defined by 1) a first substantially inner flat surface between two inner holes and an opposing second curved surface, and 2) two curved sides defined by and integral with part of the circumference of an inner hole on either side.

9. A flow conditioner, comprising:
a single disk comprising a plurality of holes and a flange; and
a vane ring clamped on or into the flange, wherein the vane ring consists of:
a ring element having a hollow center; and
a plurality of integral vanes on said ring element, wherein each integral vane is defined by a substantially flat inwardly-facing surface and two curved sides, and wherein each integral vane extends from a first planar surface of the vane ring to a second planar surface of the vane ring.

10. A pipe assembly for flow measurement, comprising:
a fluid flow pipe;
a flow conditioner according to claim 1 disposed within said fluid flow pipe in an orientation substantially perpendicular to an axis of said fluid flow pipe.

11. A fluid flow measurement system, comprising:
a fluid flow pipe;
a flow conditioner according to claim 1 disposed within said fluid flow pipe in an orientation substantially perpendicular to an axis of said fluid flow pipe; and
a flow meter downstream of the flow conditioner.

12. A flow conditioner, comprising:
a single disk comprising:
a plurality of holes including an outer ring of holes in a first plane; and
a plurality of integral vanes extending from the first plane to a second parallel plane, wherein each integral vane is defined by 1) a substantially flat inwardly-facing surface between two outer holes and 2) two curved sides, each curved side defined by and integral with part of the circumference of an outer hole.

13. The flow conditioner according to claim 12, wherein the plurality of vanes is machined out of the same material as the single disk.

* * * * *